No. 665,122. Patented Jan. 1, 1901.
W. G. MORRISON.
QUILLING MACHINE.
(Application filed Feb. 19, 1900.)
(No Model.)
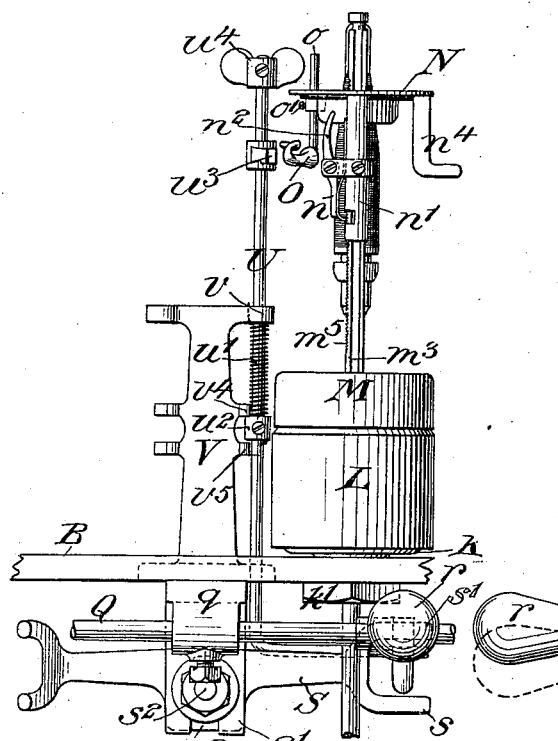
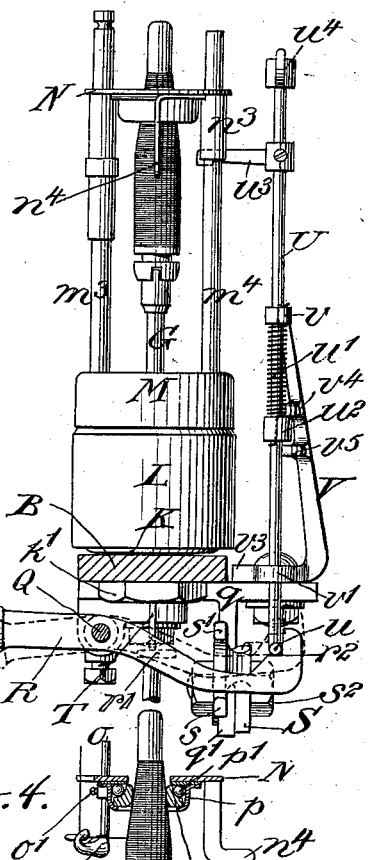
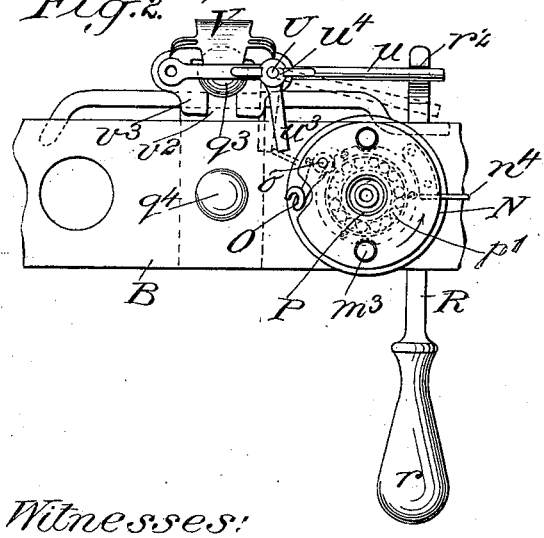
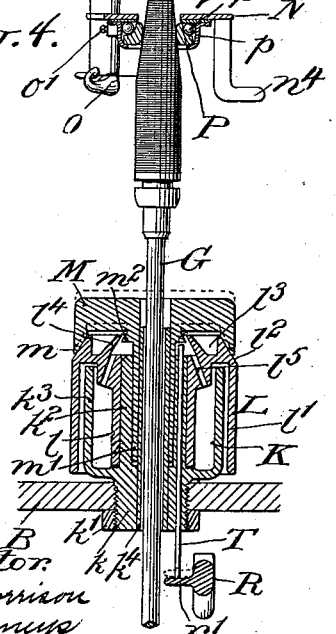
Witnesses:
George Barry Jr.
Edward Kieser
Inventor:
Walter G. Morrison
by attorneys
Brown & Seward

UNITED STATES PATENT OFFICE.

WALTER G. MORRISON, OF STONINGTON, CONNECTICUT, ASSIGNOR TO THE ATWOOD-MORRISON COMPANY, OF SAME PLACE.

QUILLING-MACHINE.

SPECIFICATION forming part of Letters Patent No. 665,122, dated January 1, 1901.

Application filed February 19, 1900. Serial No. 5,714. (No model.)

*To all whom it may concern:*

Be it known that I, WALTER G. MORRISON, a citizen of the United States, and a resident of Stonington, in the county of New London and State of Connecticut, have invented a new and useful Quilling-Machine, of which the following is a specification.

My invention relates to quilling-machines, and has for its object to provide certain new and useful improvements in the structure, arrangement, and mode of operation of the quill-holder, the bearing or bolster therefor, and the means for driving the guide-carrier support.

A practical embodiment of my invention is represented in the accompanying drawings, in which—

Figure 1 is an enlarged side elevation of the quill-spindle, the bearing, the friction driving-pulley, the guide-carrier support, the parts arranged to operate in conjunction therewith, and the support therefor. Fig. 2 is a top plan view of the same. Fig. 3 is a view similar to Fig. 1, taken at right angles thereto; and Fig. 4 is a vertical central section through the bearing, the friction driving-pulley, and the guide-carrier support, the vertical quill-holder being represented in side elevation in its normal position therein.

I have represented in the accompanying drawings only so much of quilling-machine frame as will enable a clear understanding of the operation of the several parts to which this present invention is directed.

B designates one of the side rails of the machine to which a cup-shaped bearing or bolster K is permanently secured. This bolster K has a downwardly-extended hollow central lug $k$, which has a screw-threaded engagement with the rail B, the lower end of the said lug $k$ projecting below the bottom of the said rail and being there provided with a lock-nut $k'$ for rigidly holding the bearing in its position. This bearing or bolster K has a hub $k^2$ and an annular rim $k^3$ concentric therewith, so as to form an annular oil-cup around the hub. The hub $k^2$ preferably extends a short distance above the top of the rim $k^3$.

The spindle is denoted by G and is disposed vertically and extended upwardly through the interior of the said cup-shaped bearing or bolster K. A vertically-reciprocating movement is imparted to the spindle G by the usual mechanism. (Not shown herein.)

A friction driving-pulley L is mounted to rotate within the bearing K, which pulley L is in the present instance provided with a hub $l$, which is mounted to rotate on the hub $k^2$ of the bearing and a peripheral rim $l'$. The bottom of the hub $l$ rests upon the bottom of the cup-bearing K, and the rim $l'$ is exterior to the rim $k^3$ of the bearing and is spaced a slight distance therefrom. The upper portion of the friction driving-pulley L is tapered, as shown at $l^2$. The top of the friction driving-pulley is cut away, as shown at $l^3$, and within such cut-away portion there is formed an annular flange $l^4$, which extends upwardly and inwardly from the base of the cut-away portion. One or more ducts $l^5$ lead from the space within the annular flange $l^4$ to the interior of the bearing or bolster, so that any oil which may work up between the hubs of the pulley and bearing into the space within the flange $l^4$ will be permitted to escape downwardly through the duct or ducts $l^5$ back into the oil-cup within the bearing.

The guide-carrier support is denoted by M, which support is provided on its bottom with an annular flange $m$, having its inner wall flaring, so as to snugly fit the tapered top of the friction driving-pulley L when the guide-carrier support rests in engagement therewith, whereby the rotary movement of the pulley is communicated to the guide-carrier support. The guide-carrier support is still further provided with a downwardly-extended tubular portion $m'$, which engages the inner wall of the hub $k^2$ of the bearing with an easy sliding fit, the connection between the tubular portion $m'$ and the hub $k^2$ being such that the rotary movement of the guide-carrier support will not be unduly impeded by the frictional engagement between the said tubular portion and hub. The bottom of the guide-carrier support M is provided with an annular shoulder $m^2$ around the base of the downwardly-extended tubular portion $m'$, the said shoulder serving to prevent the free escape of the oil from the space within the flange $l^4$.

A lining-tube $k^4$ is fixed to the base of the bearing K and extends upwardly with an easy sliding fit within the tubular portion $m'$ of the guide-carrier support M, which lining-tube extends upwardly to a point above the top of the friction driving-pulley L. The guide-carrier support is provided with two uprising posts or rods $m^3$ $m^4$, upon which the thread-guide carrier N is fitted to slide, which guide-carrier may be readily removed from and inserted onto the said posts. The guide-carrier is mounted upon the uprising posts of the support M in such a manner that the guide-carrier may be readily raised short distances at a time, but will be prevented from an unintentional downward movement. The means which I have shown in the accompanying drawings for accomplishing this result comprise a rack $m^5$ along the bar $m^3$ and a spring-actuated pawl $n$, carried by a downwardly-extended tubular extension $n'$ of the guide-carrier N. This pawl $n$ may be provided with a suitable tailpiece $n^2$, which may be readily grasped for raising the pawl out of engagement with the teeth upon the bar $m^3$ when it is desired to slide the guide-carrier downwardly thereon.

To prevent the cramping of the guide-carrier N, I preferably provide a downwardly-extended tubular portion $n^3$, arranged to engage the uprising post $m^4$.

The thread-guide (denoted by O) may be of any well-known and approved construction, its stem $o$ being adjustably secured to the guide-carrier N, in the present instance by means of a set-screw $o'$, which serves to clamp the shank $o$ within a socket in the carrier.

A loose lifting-ring P is mounted in antifriction-bearings in the guide-carrier in position to surround the top of the quill-holder and engage the top of the quill as it is being wound, whereby the continuous winding of the quill will gradually force the guide-carrier upwardly until the winding of the quill is completed.

In the present instance a casing $p$ is secured to the under side of the guide-carrier, and within the casing are located the loose lifting-ring P and a row of antifriction-balls $p'$. By this arrangement whenever the quill engages the loose lifting-ring P the ring will be held stationary as far as rotary movement is concerned, while the guide-carrier continues its movement around the quill.

The mechanism which I employ for stopping the rotation of the guide-carrier support, and thus stopping the winding of the quill when the quill is completed, is constructed and arranged as follows: A supporting-rod Q is supported a short distance below the side rail B in a bracket $q$, which bracket is secured by a suitable bolt $q^4$ to the under side of the said side rail B. A weighted stop-lever R is mounted to rock upon the rod Q adjacent to the spindle G, the outwardly-extended arm of the lever R being the weighted arm, the weight in the present instance being utilized as an operating-handle $r$. The vertical rocking movement of the lever R is limited by a bifurcated arm S, having its branches $s$ $s'$ extended into positions below and above the inner arm of the said lever. This bifurcated arm S is secured to a downwardly-extended arm $q'$ of the supporting-bracket $q$ in such a manner that the said arm S may be adjusted vertically. In the present instance this is accomplished by providing the downwardly-extended arm $q'$ of the bracket $q$ with an elongated slot $q^2$, extended upwardly from its lower end and providing a clamping-bolt $s^2$, arranged to engage the bifurcated arm S and the downwardly-extended arm $q'$. This bifurcated arm S is preferably made double, so that it may serve for limiting the swinging movements of two adjacent stop-levers. A vertically-sliding pin T extends upwardly through the bearing or bolster K, the said pin passing vertically through the hub $k^2$ and the downwardly-extended portion $k$ of the said bearing, the pin being so arranged that when its lower end is engaged by the inner arm of the stop-lever R and raised its upper end will engage the annular shoulder $m^2$ upon the guide-carrier support M, and thus raise the guide-carrier support away from its frictional contact with the driving-pulley L. In the present instance I have shown the inner arm of the stop-lever R as being provided with a laterally-extended lug $r'$, upon which lug the pin T rests at all times by gravity. When the inner arm of the lever R is held depressed and the weighted arm raised, the pin T will engage the shoulder $m^2$ upon the guide-carrier support. By means of a screw-threaded engagement of the bearing with the side rail and the clamping-nut $k'$ the bearing may be adjusted in a rotary manner until the pin T is brought into the required position with relation to the stop-lever.

A vertically-disposed rock-bar U for locking and releasing the stop-lever R is mounted in upper and lower bearings $v$ $v'$ in a support V, carried by the bracket $q$. This support V has an adjustment toward and away from the side rail by means of an elongated slot $v^2$ in its base $v^3$ and a clamping-bolt $q^3$, which engages the base $v^3$, and the bracket $q$. The rocking bar U is provided with a laterally-extended lower arm $u$, which is preferably a portion of the bar itself, which arm extends into position to engage the upper edge of the stop-lever R. When the rocking bar U is in its normal position, its lower arm $u$ will rest upon a step $r^2$ in the upper edge of the lever R, the step being so arranged that the lever will be held with its inner arm depressed and its outer weighted arm raised. When the rock-bar U is rocked, so as to swing its lower arm $u$ forward, the arm will be raised from the step $r^2$, and because of the cut-away portion of the upper edge of the inner arm of the stop-lever R the inner arm will be caused to rise, because of the downward movement of the outer arm by gravity. To cause the rock-bar U to return to its normal position upon the step $r^2$ when the weighted arm of the stop-lever R is raised, I provide a torsion-spring $u'$, one end of which spring is attached to the upper bearing $v$ of the bar U and the other end to a sleeve or collar $u^2$, clamped to the said bar U. This sleeve or collar $u^2$ may be adjusted rotatively for adjusting the tension of the spring $u'$, and it may also be adjusted vertically for adjusting the height of the bar U when the arm $u$ is not resting upon the step $r^2$ of the stop-lever. This sleeve or collar $u^2$ is loosely embraced by two short branches $v^5$ $v^4$, projecting laterally from the support V. This support V is preferably arranged so as to also support the next adjacent rock-bar. The rock-bar U is further provided with a vertically and rotatably adjustable upper arm $u^3$, which arm is adjusted into a position to be engaged and rocked by a tripping-arm $n^4$, depending from the guide-carrier N, when the carrier has been raised until the winding of the quill has been completed. The rock-bar U is also provided with a suitable thumb-piece $u^4$ at its top for use in operating the bar by hand when it is desired to stop the winding of the quill.

It will be seen from the above description that the guide-carrier support will be raised from its engagement with the friction driving-pulley the instant that the winding of the quill is completed. Furthermore, it will be seen that the operator may at any time also operate the stop-lever for raising the guide-carrier support from the friction-pulley. It will also be seen that the several parts are made thoroughly adjustable with respect to each other, so as to obtain the most efficient results.

It is evident that changes might be resorted to in the form and arrangement of the several parts without departing from the spirit and scope of my invention. Hence I do not wish to limit myself strictly to the structure herein set forth; but

What I claim is—

1. In a quilling-machine, the combination with a quill-holder, of a stationary cup-shaped bearing or bolster surrounding the quill-holder, a friction driving-pulley mounted in the bearing, a guide-carrier support concentric with the driving-pulley and arranged to be driven thereby and means for raising the drive-carrier support from its engagement with the driving-pulley.

2. In a quilling-machine, the combination with a quill-holder, of a stationary cup-shaped bearing or bolster concentric therewith, a friction driving-pulley mounted in the bearing, a guide-carrier support concentric with the drive-pulley and arranged to be driven thereby, a stop-lever, and a releasing-pin extended through the said bearing into position to lift the guide-carrier support away from the friction driving-pulley when the lever is operated.

3. In a quilling-machine, a friction driving-pulley having a downwardly-extended hub and a downwardly-extended outer rim concentric therewith and spaced therefrom, the top of the pulley being cut away and the pulley being further provided with one or more ducts leading from the cut-away portion to the annular space between the hub and the rim.

4. In a quilling-machine, a friction driving-pulley having a downwardly-extended hub and a downwardly-extended outer rim concentric therewith and spaced therefrom, the top of the said pulley being cut away and having an annular flange within said cut-away portion, the said pulley having one or more ducts leading from the cut-away portion within the said flange to the annular space between the hub and the outer rim.

5. In a quilling-machine, a guide-carrier support having a downwardly-extended tubular portion and a downwardly-extended peripheral flange having its inner wall flaring to form a frictional driving-surface.

6. In a quilling-machine, a guide-carrier support having a downwardly-extended tubular portion, a downwardly-extended peripheral flange and an annular shoulder at the top of the tubular portion.

7. In a quilling-machine, the combination with a bearing having an upwardly-extended hub, of a friction driving-pulley having a downwardly-extended hub mounted to rotate upon the exterior of the hub of the bearing and a guide-carrier support having a downwardly-extended tubular portion mounted to rotate within the hub of the bearing.

8. In a quilling-machine, the combination with a bearing having a hub, of a friction driving-pulley having a hub mounted to rotate upon the exterior of the hub of the bearing, a guide-carrier support having a downwardly-extended tubular portion mounted to rotate within the hub of the bearing and a lining-tube carried by the bearing and extended into the interior of the tubular portion of the guide-carrier support.

In testimony that I claim the foregoing as my invention I have signed my name, in presence of two witnesses.

WALTER G. MORRISON.

Witnesses:
B. S. CUTLER,
H. W. LAUPHEAR.